US006873424B2

United States Patent
Jakobsson et al.

(10) Patent No.: US 6,873,424 B2
(45) Date of Patent: *Mar. 29, 2005

(54) SYSTEM AND METHOD FOR INCORPORATING ADVERTISING INTO PRINTED IMAGES AND PRINTER HAVING THE SAME

(75) Inventors: Bjorn M. Jakobsson, Hoboken, NJ (US); Fabian Monrose, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 926 days.

This patent is subject to a terminal disclaimer.

(21) Appl. No.: 09/800,943

(22) Filed: Mar. 7, 2001

(65) Prior Publication Data

US 2002/0126304 A1 Sep. 12, 2002

(51) Int. Cl.⁷ .............................................. G06K 15/00
(52) U.S. Cl. ..................................... 358/1.13; 358/1.14
(58) Field of Search .......................... 358/1.1, 1.6, 1.13, 358/1.14, 1.15, 1.18, 1.16, 404, 444, 452, 450; 705/14, 39

(56) References Cited

U.S. PATENT DOCUMENTS

2002/0039193 A1 * 4/2002 Kondo et al. ............... 358/1.14
2002/0057451 A1 * 5/2002 Ishijima ..................... 358/1.15

* cited by examiner

Primary Examiner—Arthur G. Evans

(57) ABSTRACT

For use in a printer (such as a computer printer, a facsimile machine or other device suited to place data on a tangible medium), a system for, and method of, incorporating an advertisement into a printout and a printer having the system or method contained or carried out therein. In one embodiment, the system includes: (1) a memory, located in the printer, that receives and stores user content, the advertisement and verification data regarding the advertisement and (2) a processor, associated with the memory, that employs the verification data to make a verification of the advertisement and, if the verification is positive, cause the printer to continue operation.

22 Claims, 3 Drawing Sheets

SYSTEM AND METHOD FOR INCORPORATING ADVERTISING INTO PRINTED IMAGES AND PRINTER HAVING THE SAME

TECHNICAL FIELD OF THE INVENTION

The present invention is directed, in general, to printers and facsimile machines and, more specifically, to a system and method for incorporating advertising into printed images and a printer having the same.

BACKGROUND OF THE INVENTION

In a competitive business economy, advertising dollars are used to fund a large number of goods and services in exchange for product exposure. Among these are included radio, television, newspapers and even long distance calling plans. In all of these situations, advertisers agree to exchange advertising dollars for the mere chance to mention and promote their products to potential customers. For example, an advertiser might agree to fund sixty minutes of long distance calls to be distributed among customers in exchange for requiring the customers to listen to the advertiser's advertisement before those long distance calls are connected. Another example is an advertiser for a soft drink company providing all the beverages for a sporting arena at a discounted rate, or even free of charge, in exchange for the exclusive rights to distribute beverages in the arena. In this example, the advertiser recoups the money lost in providing free beverages, and potentially earns far more, through the advertising of his product to the spectators exclusive of his competitors.

Intense competition has forced advertisers to find new and ingenious ways of inundating society with their advertisements. One idea that has recently gained increased popularity is subsidizing the purchase of goods or services by advertisers. In exchange for the subsidized purchase the customer receives, the advertiser is permitted to promote his own products or services in relation to the purchased goods or services. An example of such an arrangement can be found on Internet sites. In these situations, those who wish to host such sites may have the cost of posting the sites subsidized by an advertiser. In exchange for receiving a subsidized posting, the one hosting the site must also post advertisements for the advertiser.

Although the idea of subsidizing the purchase of goods or services appears sound, some goods or services do not easily lend themselves to such subsidizing by advertisers. In a specific example, if a product advertiser sought to subsidize the sale of printers to the public, perhaps those used with computers or even facsimile machines, the price of such printers to the ultimate consumer could be reduced. In exchange for the discounted price, the customer would have to agree to have printed with each of his documents an advertisement endorsing the advertiser's product or services. In this example, both parties benefit from the subsidizing of the printer. The customer, who might not ordinarily be able to afford a printer, gets the printer at a reduced price while the advertiser has his products or services advertised to all those who receive the documents printed on the subsidized printer.

Unfortunately, although both the customer and the advertiser benefit from such an arrangement, the advertiser subsidizing the printers will likely face great risk that their advertising dollars will be lost. The risk faced by such advertisers is that some customers may attempt to bypass the required advertisement while still reaping the benefits of the discounted printer subsidized by the advertiser. For example, the customer might shut the printer off after his documents are printed in an attempt to prevent the advertisements from being printed. Alternatively, the customer may attempt to "trick" the printer into printing a blank page or blank area in place of the advertisement by altering the programming or hardware of the printer or computer. In other examples the subsidized device is not simply an ink printer, but a device for placing data onto a tangible medium, such as the recording device for a voice messaging system. In this example, tampering may prevent the advertisement from being heard while still using the system at a subsidized cost.

When successful tampering occurs, the advertising dollars spent to subsidize the purchase of printers (or any device suited for placing data on a tangible medium) would be irretrievably lost. As a result, a business model wherein an advertiser can subsidize the purchase of printers, whether they be for computers, facsimile machines or other devices for storing data, is unlikely to be developed because of the risk of altered or removed advertisements. Accordingly, what is needed in the art is a better way to ensure that advertisements are incorporated into printouts from a printer or other data recording device.

SUMMARY OF THE INVENTION

To address the above-discussed deficiencies of the prior art, the present invention provides, for use in a printer (such as a computer printer, a facsimile machine or other device suited to place data on a tangible medium), a system for, and method of, incorporating an advertisement into a printout and a printer having the system or method contained or carried out therein. In one embodiment, the system includes: (1) a memory, located in the printer, that receives and stores user content, the advertisement and verification data regarding the advertisement and (2) a processor, associated with the memory, that employs the verification data to make a verification of the advertisement and, if the verification is positive, cause the printer to continue operation.

The present invention therefore introduces a way of verifying that a printer is actually printing advertising content, as it is supposed to do. Such verification is important to advertisers, allowing them to justify underwriting at least a portion of the cost of the printer in turn for the opportunity to present advertisements to the printer's user. The term "printer," as used in the following discussion, includes not only ink printing devices, but also includes any device adapted to place data onto a tangible medium. Examples of such a printer may thus include a computer printer, a facsimile machine or even a simple recording device.

In one embodiment of the present invention, the verification data is a digital signature of the advertisement. Those skilled in the art are familiar with digital signatures and their ability to confirm that the digitally signed data are intact. Of course, the present invention can employ any conventional or later-discovered technique for verifying the fidelity of data, depending upon the level of confidence desired.

In one embodiment of the present invention, if the verification is positive, the processor causes the printer to print both the user content and the advertisement on a sheet of paper. Ostensibly, if the verification is negative, the printer stops operating, requiring the user to have the printer repaired. Preferably, however, the printer simply refuses to print current or future user content until the verification is positive.

In one embodiment of the present invention, if the verification is positive, the processor causes the printer to continue to print future user content. In this embodiment, the potentially lengthy process of verification does not forestall printing. Instead, verification is performed at the printer's leisure; if verification is negative, the printer stops operating with respect to future user content, requiring the user to have the printer repaired.

In one embodiment of the present invention, the printer is a printer for a computer. The memory can receive the advertisement from a computer network coupled to the printer. Alternatively, the memory can store multiple advertisements locally, or receive them from the user's computer as required.

In another embodiment of the present invention, the printer further includes facsimile communication circuitry coupled to the memory and the processor. In this embodiment, the printer is a facsimile machine. Accordingly, the user content takes the form of a facsimile image and the memory receives the advertisement from a facsimile source, perhaps another facsimile machine or a network.

In an even broader sense, the present invention may be applied to voice messaging, wherein an audible advertisement is sent along with a message to a playback unit of any conventional or later-discovered type. The advertisement is verified within the playback unit and then played along with the message. In this manner, an advertiser can financially support the communication of voice messages.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
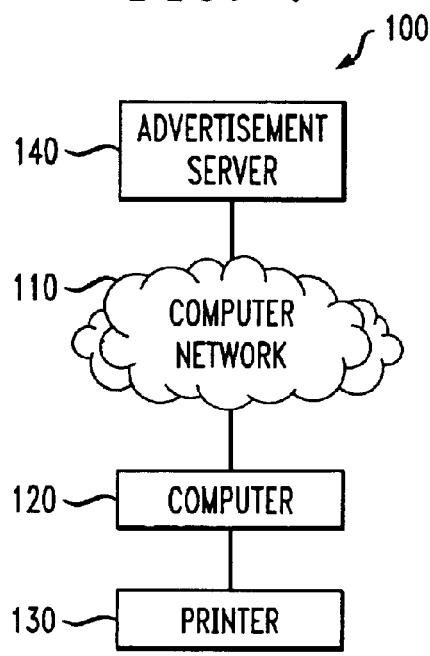
FIG. 1 illustrates a block diagram of a computer network, computer and printer that forms an environment within which the present invention can operate.

Referring initially to FIG. 1, illustrated is a block diagram of an environment 100 within which the present invention can operate. The environment 100 includes a computer network 110. The computer network 110 can be any type of communications network for computers including, but not limited to, the Internet, a local area network (LAN), or even a voice messaging system.

The environment 100 further includes a computer 120, coupled to the network 110, and a printer 130, coupled to the computer 120. The computer 120 is used to create or receive user content or other data for printing with the printer 130. Included in this data are selected advertisements to be printed along with the user content, in accordance with the principles of the present invention. For purposes of the present invention, the term "print" refers to any means by which data is placed onto a tangible medium, including paper or a data storage device such as a computer disk or magnetic tape. Also, the term "printer" includes any device adapted to place the data onto such tangible medium, such as a computer printer, a facsimile machine or even a recording device. As such, the term "printout" as used herein simply refers to the output of such a "printer" and is not intended to be limited to paper documents produced by ink or laser printing devices.

Advertisements printed according to the present invention can be selected through a variety of means. In one embodiment, the advertisements to be printed can be selected based on the content of what the user is printing. For example, if the user is about to print a document regarding the fuel efficiency of certain automobiles, the advertisement printed along with the document may be for a financing plan offered by an automobile dealership that sells one of the types of automobiles discussed in the document. In another embodiment, the type of advertisement selected for printing can be based on the user, or the user's computer specifications, or even the type of printer being used. Yet in another embodiment, the advertisement can be selected randomly and not based upon any criteria.

The environment 100 further includes an advertisement server 140. The advertisement server 140 transmits the advertisements to be printed to the computer 120 via the computer network 110. In an alternative embodiment of the present invention, the advertisements are included on a storage device, such as a compact disc read-only memory ("CD-ROM"), which the user is required to install on the computer 120 before the printer 130 will operate properly. Using such a storage medium, the advertisements can be updated by simply sending a new CD-ROM or other storage medium to the user as necessary. In another embodiment, the advertisements are included with the printer driver software required to be installed for the printer 130 to interface and communicate with the computer 120. In yet another embodiment, the advertisements can be permanently installed into the printer 130 itself, eliminating the need for the computer network 110 and the advertisement server 140 to provide the advertisements. Although different methods and systems of providing the advertisements to the user for printing have been illustrated or described, those skilled in the art understand that the present invention is not limited to any particular method of advertisement delivery.

Figure 2:
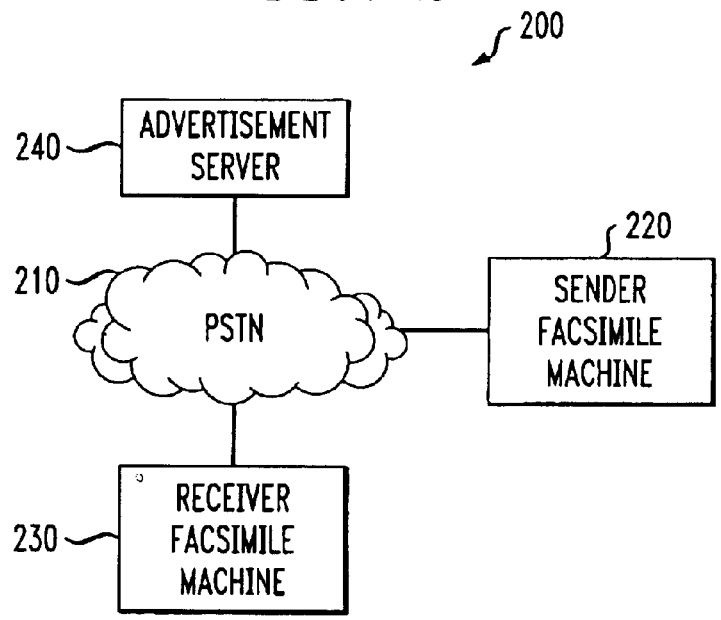
FIG. 2 illustrates a block diagram of a pair of facsimile machines in communication, forming an alternative environment within which the present invention can operate.

Turning now to FIG. 2, illustrated is a block diagram of an alternative environment 200 within which the present invention can operate. The environment 200 includes a public switched telephone network (PSTN) 210. The environment 200 further includes a sender facsimile machine 220 and a receiver facsimile machine 230, each coupled to the PSTN 210. The environment 200 also includes an advertisement server 240 coupled to the PSTN 210.

The sender facsimile machine 220 is used to transmit documents to a user via the PSTN 210. The receiver facsimile machine 230 receives the transmission and subsequently prints the documents incorporating the selected advertisement on the printed page.

In the illustrated embodiment, the advertisements to be printed can be provided to the user through a variety of methods. In one embodiment, the sender facsimile machine 220 can be programmed to first connect with the advertisement server 240 via the PSTN 210 before transmitting the original data. Once connected, the advertisement server 240 transmits the advertisement to be printed by the receiver facsimile machine 230 to the sender facsimile machine 220, and the sender facsimile machine 220 then transmits both the original data and the advertisement to the receiver facsimile machine 230.

In another embodiment of the present invention, the advertisement server 240 dials up and connects to the receiver facsimile machine 230 when the receiver facsimile machine 230 is not in operation and transmits the advertisements to be printed. The transmitted advertisements are stored in memory associated with the receiver facsimile machine 220 until needed for printing. Yet in another embodiment, the receiver facsimile machine 230 dials the advertisement server 240 while not in use, or perhaps even in response to a transmission from the sender facsimile machine 220, to request the advertisements. As before, although different methods of providing the advertisements to the receiver facsimile machine 230 for printing have been described, those skilled in the art understand that the present invention is not limited to any particular method of advertisement delivery.

Figure 3:
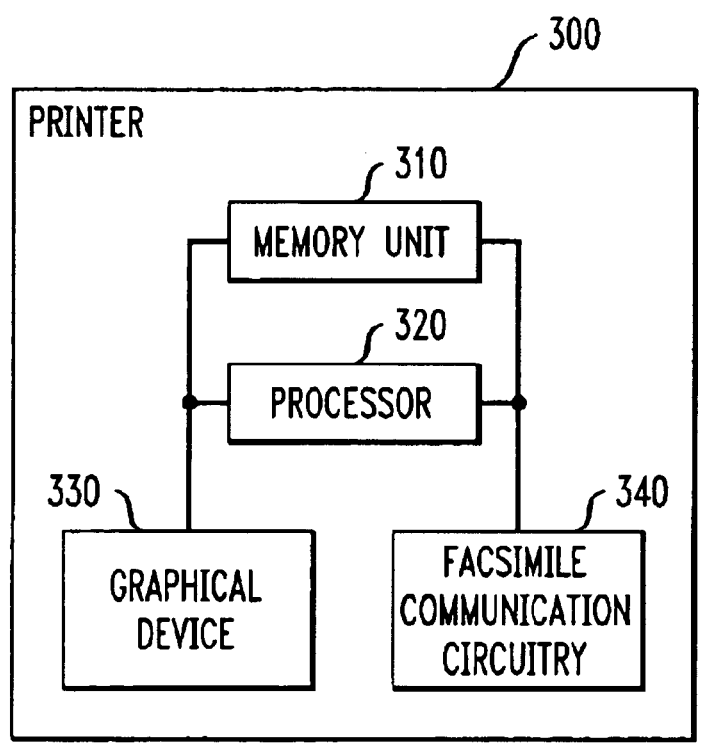
FIG. 3 illustrates a block diagram of a printer having a system constructed according to the principles of the present invention.

Turning now to FIG. 3, illustrated is a block diagram of a printer 300 having a system constructed according to the principles of the present invention. In the illustrated embodiment, the printer 300 is the printing device of a facsimile machine. In an alternative embodiment, the printer 300 is a typical computer printer, such as the printer 130 in FIG. 1. Although only two embodiments of printers are discussed with respect to the system of the present invention, those skilled in the art will understand that the present invention is not limited to any particular printing device, and is broad enough to encompass any similar device capable of printing user content and advertisements on paper or any other medium, tangible or intangible. In fact, in its broadest form, the present invention encompasses a voice messaging system, or similar computerized system, wherein an advertisement is required to be heard before the user may recover his messages. In this embodiment, the fee for using the voice messaging service is reduced in exchange for having the advertisements heard.

The printer 300 includes a memory unit 310. The memory unit 310 stores information needed by the printer 300 to print the information. This information includes the user content sought to be printed as well as the selected advertisement to be incorporated onto the printed document. The information also includes verification data pertaining to the advertisement. The verification data is used to confirm that an advertisement has printed (or will be printed) in addition to the user content, and that the advertisement is a valid advertisement. For purposes of the present invention, a "valid advertisement" is an actual, present advertisement that has been selected by advertisers to be printed simultaneously with the user content.

The printer 300 further includes a processor 320 that is coupled to the memory unit 310 and is used to process the data to be printed, including both the user content and the selected advertisement. The printer 300 further includes a graphical device 330, coupled to the processor 320 and to the memory unit 310. The graphical device 330 is the part of the printer 300 that actually prints the information designated for printing on the available medium. The printer 300 also includes facsimile communication circuitry 340. The facsimile communication circuitry 340 is coupled to both the processor 320 and the memory unit 310, and is used to receive and transmit data in a facsimile format to and from another facsimile machine via the PSTN 210 illustrated in FIG. 2.

The printer 300 functions as follows. The user designates user content for printing by the printer 300. This data is then stored in the memory unit 310 of the printer 300 until needed for printing. The printer 300 also stores verification data in the memory unit 310. The verification data is used to verify the existence of the advertisement, as well as its validity, and that the advertisement was printed. Such data may be transmitted along with the advertisement, programmed into the printer 300 or by any other means now known or later developed. By employing verification data in such a way, tampering of the advertisement itself by users, perhaps attempting to remove the advertisement entirely or replace it with a "blank advertisement," can be prevented.

The processor 320 then accesses the memory unit 310 to retrieve all necessary information, and, after compiling the information, employs the verification data to verify the advertisement. In a preferred embodiment, the processor 320 verifies a digital signature associated with the advertisement. By requiring verification of the advertisement, by whatever means, the integrity of the information may remain in tact when it arrives at the printer 300. One skilled in the pertinent art is familiar with the benefits and the use of digital signatures. The use of digital signatures as a means of advertisement verification will be described below in greater detail. In an alternative embodiment, the verification data consists of message authentication codes (MACs). Those skilled in the art are also familiar with the use of MACs to verify the fidelity of data.

Next, the processor 320 activates the graphical device 330 to print the data and the advertisement information stored in the memory unit 310. A printout of the user content and the selected advertisement is then created on paper or other medium for the user. Preferably, the user content and advertisement are printed together, without any type of break between the two. By printing the user content and advertisement without a page break or other means of separation, the user could not simply separate the two for printing and then disregard the advertisement. Additionally, multiple advertisements may also be printed without page breaks so as to prevent separation of any or all such advertisements. In a preferred embodiment, if the printer 300 is an ink printer the lack of a page break is confirmed by the printer 300 itself, rather than through software programming such as the printer's 300 driver software. Those skilled in the art are familiar with how simple it may be to penetrate and alter software programs.

In a related embodiment, additional requirements may be added to the verification in accordance with a policy built or programmed into the printer 300. Specifically, in addition to verifying a digital signature, there may be a requirement that predetermined bits (or even pixels) on the printout are set to one. For example, there may be a requirement that the data to be printed have no "end of page" instruction so as to ensure the desired user content and advertisement are printed. In this example, if an "end of page" instruction is found (as a result of tampering or otherwise) the printer 300 may be instructed to print the same (or another) advertisement to ensure its existence in the final printout.

Also in the preferred embodiment of the present invention, the verification data is a "digital signature" of the advertisement. A digital signature is an electronic (rather than a written) signature that can be used by someone to authenticate the identity of the sender of a message or to ensure that the original content of the message or document that has been conveyed is unchanged. With respect to the present invention, a digital signature associated with an advertisement will ensure that the advertisement has not been eliminated or modified in any way by the user of the printer 300. As a result, advertisers subsidizing the purchase of printers can be assured their advertisements are being printed with the user content. Those skilled in the art are familiar with implementing digital signatures and their ability to confirm that the digitally signed data are intact. Of course, the present invention is not limited to the use of digital signatures and can employ any conventional or later-discovered technique for verifying the fidelity of data, depending upon the level of confidence desired.

In one embodiment, if the verification is positive (i.e., the advertisement is valid and present), the processor 320 allows the printer 300 to continue operation, causing the graphical device 330 of the printer 300 to print both the user content and the advertisement on a sheet of paper. Preferably, if the verification is negative, the printer 300 refuses to print the specified user content until a proper verification is obtained. Alternatively, the printer 300 simply stops operating entirely requiring the user to have the printer 300 serviced before future user content may be printed. In another embodiment of the present invention, the printer 300 does not forestall or otherwise delay printing, since the verification of the digital signature is a potentially lengthy process. In this embodiment, the printer 300 performs the verification when the printer 300 is not being used to print or is idle. Once the printer 300 has the opportunity to positively verify the validity of the advertisement, the processor 320 causes the printer 300 to continue to print future user content. However, if verification is negative, the printer 300 stops operating with respect to any future user content, requiring the user to have the printer 300 repaired or otherwise reset before any future user content can be printed.

Other embodiments of the present invention may require the printer 300 to take other action when an advertisement is not properly verifiable. For example, in one embodiment if the printer 300 is connected to a charging network, the printer 300 may cause a payment to be may from the user's account for its use. Alternatively, the printer 300 receives all the user content to be printed and simply waits to print it until a proper verification is obtained or a payment is made. Additionally, the printer 300 may print out a message informing the user of the problem and perhaps the steps necessary to resolve the problem.

Figure 4:
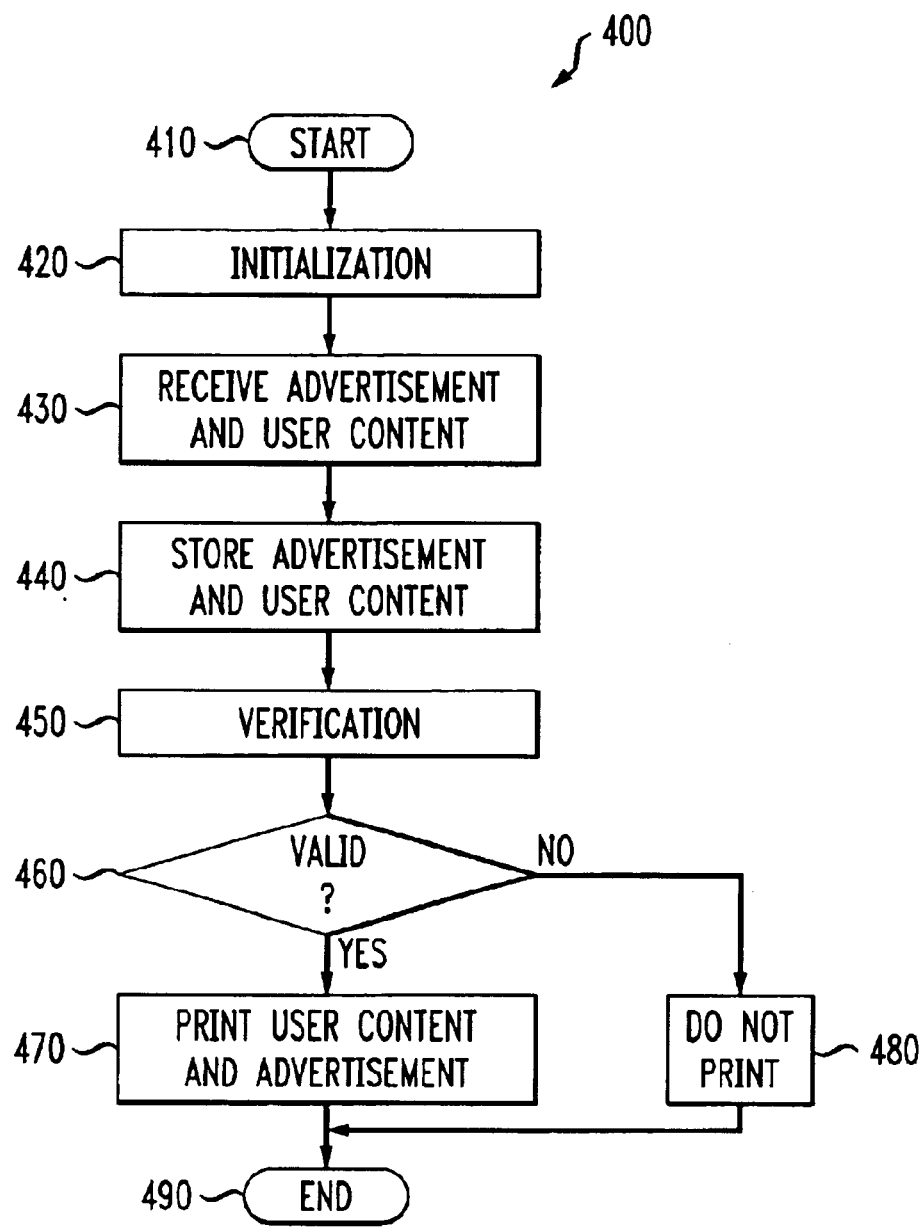
FIG. 4 illustrates a flow diagram of a method of incorporating advertising into a printed image carried out according to the principles of the present invention.

Turning now to FIG. 4, illustrated is a flow diagram 400 of a method of incorporating advertising into a printed image carried out according to the principles of the present invention. The method begins in a start step 410. In a step 420, the printer 300, whether part of a computer system, a facsimile machine, a voice messaging system or other device, is initialized and made ready for operation.

In a step 430, the advertisements to be printed, as well as any verification data, are received by the printer 300. As discussed above, this information can be received from an advertisement server via a computer network, a CD-ROM, the printer driver software or can be hard-wired into the printer's 300 hardware. Alternatively, if the printer 300 is part of a facsimile machine, the information can be received from an advertisement server either when the facsimile machine contacts the server or when the facsimile machine is contacted by the server while not in use.

Once received, the advertisements and verification data, along with the user content to be printed, are stored in the memory unit 310 of the printer 300 in a step 440. The data remains in the memory unit 310 until needed for verification and printing. In one embodiment, the verification data may be comprised of a digital signature accompanying the advertisement. The present invention, however, is not limited to requiring the use of a digital signature. In a step 450, the present invention verifies whether the advertisement is valid before printing the user content.

In a decision step 460, the printer 300 determines if the advertisement to be printed is valid. If the advertisement is valid, both the user content and advertisement are retrieved from the memory unit 310 and printed for the user in a step 470. However, if in the step 460 the advertisement receives a negative verification, for example, the advertisement is not the advertisement intended to be printed by the advertiser or the user has attempted to completely remove the advertisement from the printer's memory unit 310, the method moves to a step 480. In step 480, the printer 300 does not print the user content, and will not print any future user content, until a proper verification has been obtained, or until the printer has been serviced to resolve the reason the selected advertisement cannot be verified.

In an alternative embodiment, verification occurs after the user content and advertisement have been retrieved from the memory unit 310 and while the printer 300 prints the user content. In this embodiment, if the advertisement receives a negative verification, the printer 300 immediately stops printing the current user content, and again will not print any further user content until the verification problem has been resolved.

In another alternative embodiment, the printer 300 retrieves the user content from the memory unit 310 and proceeds to print the user content. In this embodiment, a "flag" is simultaneously placed in the printer 300 signaling a negative verification. Then, after the user content has been printed and the printer 300 is no longer being used to print, verification of whether a valid advertisement has been printed takes place. If the advertisement receives a positive verification, the flag is removed and the printer 300 continues to operate normally. In this situation, a similar flag would be placed each time data is printed for the user and the verification process would be repeated. If the advertisement receives a negative verification, the flag remains in place and the printer 300 will not print any future user content until the verification problem has been corrected.

While different methods of assuring a selected valid advertisement is printed along with the user content have been described, each with their own particular benefits, the present invention is not limited to any single method and is broad enough to encompass any equivalent method of verification. Moreover, other embodiments of the method of verification of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. For use in a printer, a system for incorporating an advertisement into a printout, comprising:
   a memory, located in said printer, that receives and stores user content, said advertisement and verification data regarding said advertisement; and a processor, associated with said memory, that employs said verification data to make a verification of said advertisement and, if said verification is positive, cause said printer to continue operation.

2. The system as recited in claim 1 wherein said verification data is a digital signature of said advertisement.

3. The system as recited in claim 1 wherein, if said verification is positive, said processor causes said printer to print both said user content and said advertisement on a sheet of paper.

4. The system as recited in claim 1 wherein, if said verification is positive, said processor causes said printer to continue to print future user content.

5. The system as recited in claim 1 wherein, if said verification is negative, said processor causes said printer to cease to print future user content.

6. The system as recited in claim 1 wherein said system is a voice messaging system and said printout is a recording for use with said system.

7. The system as recited in claim 1 wherein said memory receives said advertisement from a computer network coupled to said printer.

8. For carrying out within a printer, a method of incorporating an advertisement into a printout, comprising:

storing user content, said advertisement and verification data regarding said advertisement in a memory in said printer;

employing said verification data to make a verification of said advertisement, and causing said printer to continue operation if said verification is positive.

9. The method as recited in claim 8 wherein said verification data is a digital signature of said advertisement.

10. The method as recited in claim 8 wherein said causing comprises causing said printer to print both said user content and said advertisement on a sheet of paper if said verification is positive.

11. The method as recited in claim 8 wherein said causing comprises causing said printer to continue to print future user content if said verification is positive.

12. The method as recited in claim 8 wherein said causing comprises causing said printer to cease to print future user content if said verification is negative.

13. The method as recited in claim 8 wherein said storing comprises storing said user content, advertisement and verification data regarding said advertisement in the memory unit of a voice messaging system.

14. The method as recited in claim 8 further comprising receiving said advertisement from a computer network coupled to said printer.

15. A printer, comprising:

a memory that stores user content and an advertisement to be printed and verification data;

a graphical device, coupled to said memory, that causes said images to be printed on pieces of paper;

a processor, coupled to said memory and said graphical device, that employs said verification data to make a verification of said advertisement and, if said verification is positive, cause said printer to continue operation.

16. The printer as recited in claim 15 wherein said verification data is a digital signature of said advertisement.

17. The printer as recited in claim 15 wherein, if said verification is positive, said processor causes said printer to print both said user content and said advertisement on a sheet of paper.

18. The printer as recited in claim 15 wherein, if said verification is positive, said processor causes said printer to continue to print future user content.

19. The printer as recited in claim 15 wherein, if said verification is negative, said processor causes said printer to cease to print future user content.

20. The printer as recited in claim 15 wherein said printer is a voice messaging system and said printout is a recording for use with said system.

21. The printer as recited in claim 15 wherein said memory receives said advertisement from a computer network coupled to said printer.

22. The printer as recited in claim 15 further comprising facsimile communication circuitry coupled to said memory and said processor, wherein said user content is a facsimile image and wherein said memory receives said advertisement from a facsimile source.

* * * * *

UNITED STATES PATENT AND TRADEMARK OFFICE
CERTIFICATE OF CORRECTION

| | | |
|---|---|---|
| PATENT NO. | : 6,873,424 B2 | Page 1 of 1 |
| APPLICATION NO. | : 09/800943 | |
| DATED | : March 29, 2005 | |
| INVENTOR(S) | : Bjorn M. Jakobsson et al. | |

It is certified that error appears in the above-identified patent and that said Letters Patent is hereby corrected as shown below:

On the patent title page, at column 2, Item (45), the text "Date of Patent: *Mar. 29, 2005" should read --Date of Patent: Mar. 29, 2005--.

On the patent title page, at column 1, in the section "(*) Notice", the text "This patent is subject to a terminal disclaimer." should be deleted.

Signed and Sealed this
Eleventh Day of November, 2014

Michelle K. Lee
*Deputy Director of the United States Patent and Trademark Office*